(12) United States Patent
Carr et al.

(10) Patent No.: US 10,127,517 B2
(45) Date of Patent: Nov. 13, 2018

(54) METHOD AND SYSTEM TO FACILITATE SAME DAY DELIVERY OF ITEMS TO A CUSTOMER

(71) Applicant: Wal-Mart Stores, Inc., Bentonville, AR (US)

(72) Inventors: David Jon Carr, Mountain View, CA (US); Richard Mark Ramsden, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 829 days.

(21) Appl. No.: 14/042,399

(22) Filed: Sep. 30, 2013

(65) Prior Publication Data
US 2014/0095350 A1    Apr. 3, 2014

Related U.S. Application Data

(60) Provisional application No. 61/709,029, filed on Oct. 2, 2012.

(51) Int. Cl.
*G06Q 30/00* (2012.01)
*G06Q 10/08* (2012.01)
*G06Q 30/06* (2012.01)

(52) U.S. Cl.
CPC ..... *G06Q 10/08355* (2013.01); *G06Q 10/083* (2013.01); *G06Q 30/0603* (2013.01); *G06Q 30/0633* (2013.01)

(58) Field of Classification Search
CPC ..... G06Q 30/0601–30/0645; G06Q 10/08355; G06Q 10/083; G06Q 30/0603; G06Q 30/0633; G06Q 30/06–30/08

USPC ............................................. 705/26.1–27.2
See application file for complete search history.

(56) References Cited

U.S. PATENT DOCUMENTS

| | | | |
|---|---|---|---|
| 6,701,299 B2 | 3/2004 | Kraisser |
| 6,933,832 B1 | 8/2005 | Simms |
| 7,040,541 B2 | 5/2006 | Swartz |
| 8,244,594 B2 | 8/2012 | Barron |
| 8,306,838 B2 | 11/2012 | Heise |
| 8,326,698 B1 | 12/2012 | Tam |
| 8,429,019 B1 | 4/2013 | Yeatts |
| 8,473,425 B1 | 6/2013 | Maurer |
| 8,635,113 B2 | 1/2014 | Borders |

(Continued)

FOREIGN PATENT DOCUMENTS

| | | |
|---|---|---|
| EP | 0856812 A2 | 8/1998 |
| WO | WO2001071631 A2 | 9/2001 |
| WO | WO2001073648 A2 | 10/2001 |

*Primary Examiner* — Ethan D Civan
(74) *Attorney, Agent, or Firm* — Bryan Cave Leighton Paisner LLP

(57) ABSTRACT

Techniques for allowing a store to provide same day delivery to customers are disclosed. The techniques include receiving a delivery location for delivery of the item with a customer order, providing the delivery location to a delivery server, the delivery server comparing the delivery location to existing delivery locations for a same day delivery route, and providing potential delivery times to the store server. The techniques also include the store server correlating the possible delivery times with predetermined delivery windows, presenting to the customer potential delivery windows for the order, and receiving from the customer a selection of a delivery window.

20 Claims, 11 Drawing Sheets

(56) References Cited

U.S. PATENT DOCUMENTS

| | | | |
|---|---|---|---|
| 2001/0042023 A1 | 11/2001 | Anderson | |
| 2002/0147654 A1* | 10/2002 | Kraisser | G06Q 10/0631 |
| | | | 705/330 |
| 2003/0046173 A1 | 3/2003 | Benjier | |
| 2004/0030572 A1* | 2/2004 | Campbell | G01C 21/26 |
| | | | 705/333 |
| 2004/0164847 A1 | 8/2004 | Hale | |
| 2005/0165629 A1 | 7/2005 | Bruns | |
| 2005/0228705 A1* | 10/2005 | Irwin | G06Q 10/08 |
| | | | 705/7.19 |
| 2007/0112647 A1* | 5/2007 | Borders | G06Q 10/0631 |
| | | | 705/7.35 |
| 2009/0281921 A1* | 11/2009 | Foster | G06Q 30/06 |
| | | | 705/26.1 |
| 2013/0198042 A1 | 8/2013 | Seifen | |
| 2013/0325741 A1 | 12/2013 | Smalling | |

* cited by examiner

METHOD AND SYSTEM TO FACILITATE SAME DAY DELIVERY OF ITEMS TO A CUSTOMER

BACKGROUND INFORMATION

Field of the Disclosure

The present invention relates to delivery of items to a customer. In particular, examples of the present invention relate to an approach for facilitating the same day delivery of items from a store to a customer.

Background

Many customers desire to order items online and have these items delivered to their home instead of going to a store to purchase the items. Modern supermarkets or super centers sell a significant variety of items, including groceries, home goods, automotive goods, sporting goods, etc. Many of these companies also maintain an online retail environment. It can, however, be difficult to deliver goods such as perishable goods in a timely en economic manner while simultaneously meeting customer expectations regarding a delivery schedule.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
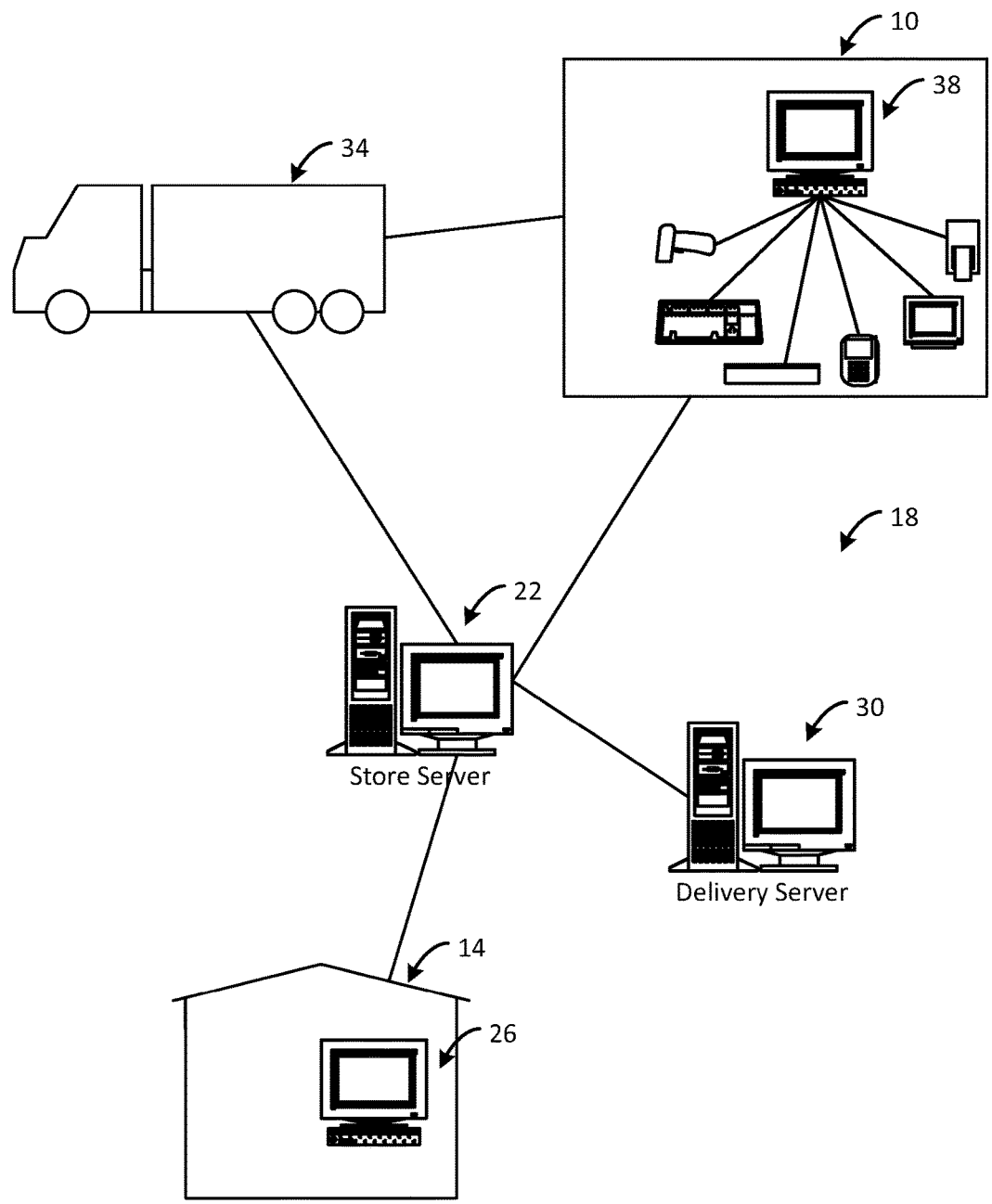
FIG. 1 is a schematic illustrating various aspects of a store delivery system according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how a store may provide same day delivery to customers. Particularly, the present disclosure describes how a store may manage a delivery service, delivery routes, delivery times, and order fulfillment to efficiently provide same day delivery.

Referring to FIG. 1, a customer may desire to purchase items from a store 10. The store 10 may be representative of a larger corporate environment which may provide many avenues of interface with a customer. In a modern shopping environment, a store 10 may include both one or more brick and mortar retail locations and an on line retail location. In some situations, a customer may not desire to go to the store 10 or may not have sufficient time to go to the store. In this situation, the customer may desire to order items from the store 10 and have the items delivered to a customer location 14 such as the customer's residence, business, etc.

The store 10 may include a computer system 18 which allows orders to be efficiently delivered to a customer location 14 and to allow orders to be delivered to a customer location the same day that the order is placed. For clarity in discussing the various function of the computer system 18, multiple computers and servers are discussed as performing different functions in delivering goods to a customer. These different computers may, however, be implemented in multiple different ways such as modules within a single computer, as nodes of a computer system, etc.

The computer system 18 may include a store server 22. The store server 22 may host a store webpage which allows a customer to, via a customer computer 26, interact with the store 10 and place an order for one or more items from the store 10. The store server 22 may include a database of items which are for sale within the store 10 with information relevant to these items. The store server 22 may include software to allow delivery of items to a customer. Particularly, the store server 22 may provide an internet webpage to allow a customer to select items, select delivery information, and purchase the items in a virtual shopping environment. The store server 22 may communicate with other computers to deliver the items to the customer.

The system 18 may also include a delivery server 30. The delivery server 30 may manage delivery routes for a delivery service 34 which delivers goods to a customer. The delivery server 30 may determine when, during a day, there is sufficient time to deliver an order to the customer and may provide information to the store server 22 to allow the store server to provide customized information to the customer during the ordering process to allow the customer to select a desired delivery window which may be fulfilled by the store 10 and delivery service 34.

The system 18 may also include an order fulfillment system 38. The order fulfillment system 38 may interact with the store 10 and assist the store employees in picking items for orders and in providing these items to a delivery service 34 for delivery to customers.

A customer who is purchasing items from the store 10 for delivery to a customer location 14 will typically view an internet webpage corresponding to the store. The customer may have an account with the store and may sign into the webpage. A customer account may include information about the customer such as name, address, past purchase history, etc. The webpage may display to the customer items at the store 10 which are available for delivery. Not all items may be available for delivery. The customer may select items for purchase. In signing into an account or entering information for a purchase, the store server 22 may receive (from the customer) customer information which facilitates delivery of goods to the customer. Particularly, the store server 22 may receive the address of the customer location 14 where purchased items are to be delivered.

The store server 22 may provide customer information, such as the address of the customer location 14, to the delivery server 30. The delivery server 30 may use the customer information to determine time periods during the day when a delivery service 34 may deliver the items to the customer. The delivery server may manage multiple delivery trucks/routes throughout the day for the delivery service 34 and may determine how much time a delivery truck has available and how much time is required to deliver the items to the customer location 14. The delivery server 30 may determine when during the day a delivery truck (or other delivery vehicle) may deliver the items to the customer. The delivery server 30 may provide information regarding when the delivery service 34 is able to deliver items to the customer location 14 to the store server 22.

The store server 22 may receive information regarding delivery time periods from the delivery server 30. The store server 22 may correlate these delivery time periods to predetermined delivery windows associated with the store 10 and may provide one or more delivery windows to the customer as the customer completes an order of items from the store 10. The customer may select a delivery window and finalize and pay for their order. When the customer order is finalized, the store server 22 may transmit order information to the delivery server 30 to reserve the delivery time for the customer. The delivery server 30 may reserve an amount of time on a deliver vehicle, reducing the number of available delivery windows which will be presented to subsequent customers who desire items to be delivered.

At a predetermined time before a delivery vehicle from the delivery service 34 must begin delivering orders, available orders for that vehicle are closed. The store server 22 may indicate to the delivery server 30 that orders are closed for the delivery vehicle. The delivery server 30 may then transmit a delivery route itinerary to the store server 22. The delivery itinerary may include all deliveries for a delivery vehicle and may present these deliveries in a predetermined order to the delivery vehicle. The store server 22 may add additional information regarding the customer or customer order to the delivery itinerary and may then transmit the delivery itinerary to the delivery service 34.

The store server 22 may then transmit information regarding the orders on the delivery itinerary to the store 10, and in particular to the order fulfillment system 38. The order fulfillment system 38 may include a computer system as well as handheld devices to assist store employees in preparing customer orders for delivery. The order fulfillment system 38 may include a handheld device which provides information to a store employee, allows a store employee to scan items, and allows a store employee to print a sticker for those items. The store employee may collect items throughout the store 10 and arrange those items for delivery to one or more customer locations. The delivery service 34 may arrive at the store 10, receive items for one or more customer orders, and deliver those items to one or more customer locations 14.

Figure 2:
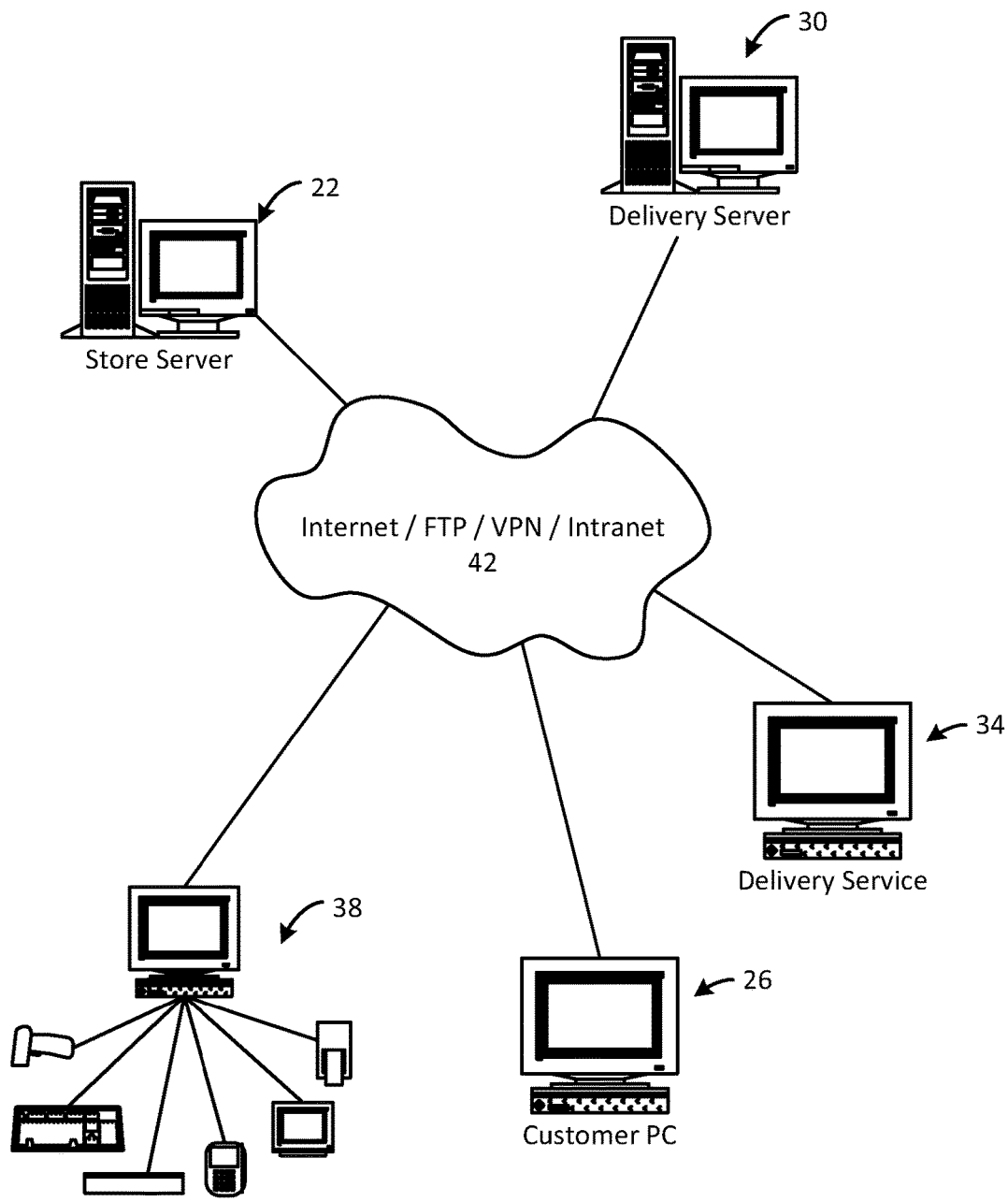
FIG. 2 is a schematic illustrating a store computer system in context of order fulfillment and delivery.

Referring to FIG. 2, in selected embodiments, the software, hardware, and associated components of a store computer system 18 may be programmed and configured to implement one or more embodiments described herein. A customer may communicate with a store server 22 via a computer 26 and a network connection or internet connection 42 to select items for purchase. The store server 22 may also communicate with a delivery server 30, delivery service 34, and order fulfillment computer system 38 via a network connection or internet connection 42.

Figure 3:
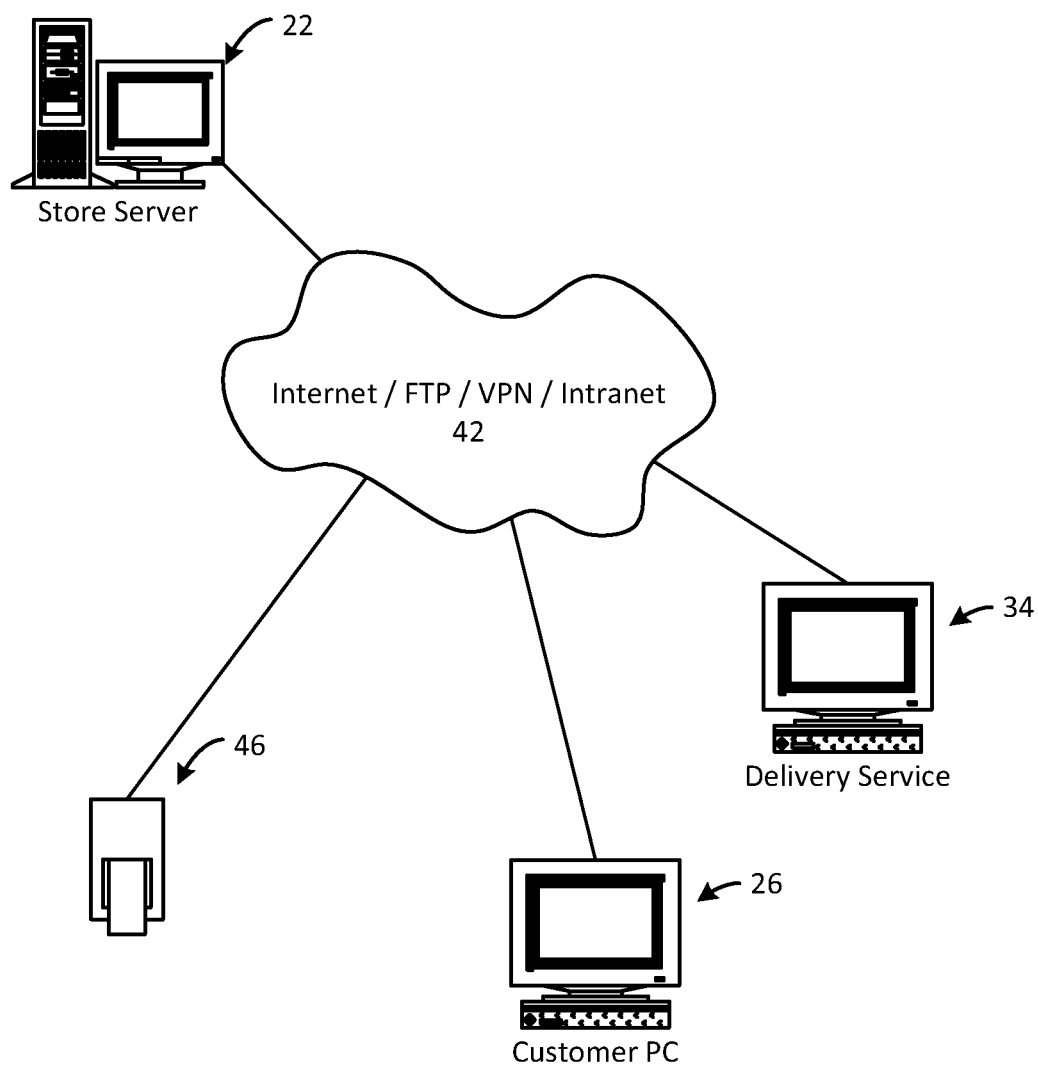
FIG. 3 is a schematic illustrating a store computer system in context of order fulfillment and delivery.

Referring to FIG. 3, in selected embodiments, the hardware, software, or hardware and software of store server 22 may be configured to receive and utilize item information as described herein, performing functions associated with the delivery server and order fulfillment computer system 38. The store server may communicate with a customer computer 26, a deliver service computer 34, and a store handheld device 46 via a network connection or internet connection 42. In this manner, the various aspects of the system may be exemplified as software, modules, nodes, etc. of a store computer or server 22.

Figure 4:
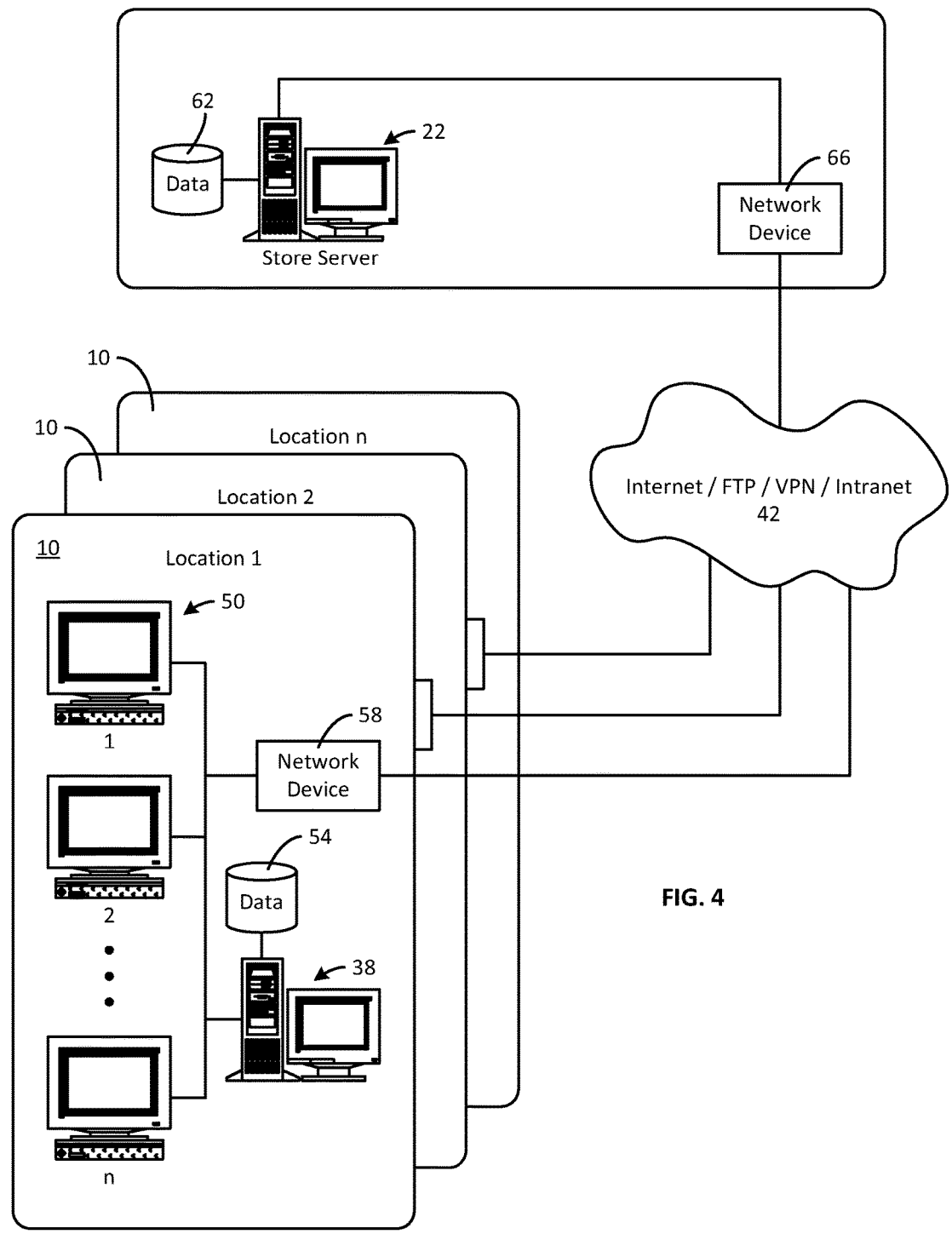
FIG. 4 is a schematic illustrating a store computer system in context of order fulfillment and delivery.

Referring to FIG. 4, in selected embodiments, a store computer system 18 may operate substantially independently, as a stand-alone unit.

Alternately, a store system 18 may operate as a larger system. For example, multiple stores 10 may operate at different locations (e.g. different brick-and-mortar stores). In such embodiments, each local system may have a computer/server 38 as well as other computers or handheld devices 50, data storage devices 54, and networking devices 58 as necessary. Each local system may be connected to the store server 22 via a network or internet connection 42. The store server 22 may be associated with data storage 62 and a network device 66 as necessary.

Figure 5:
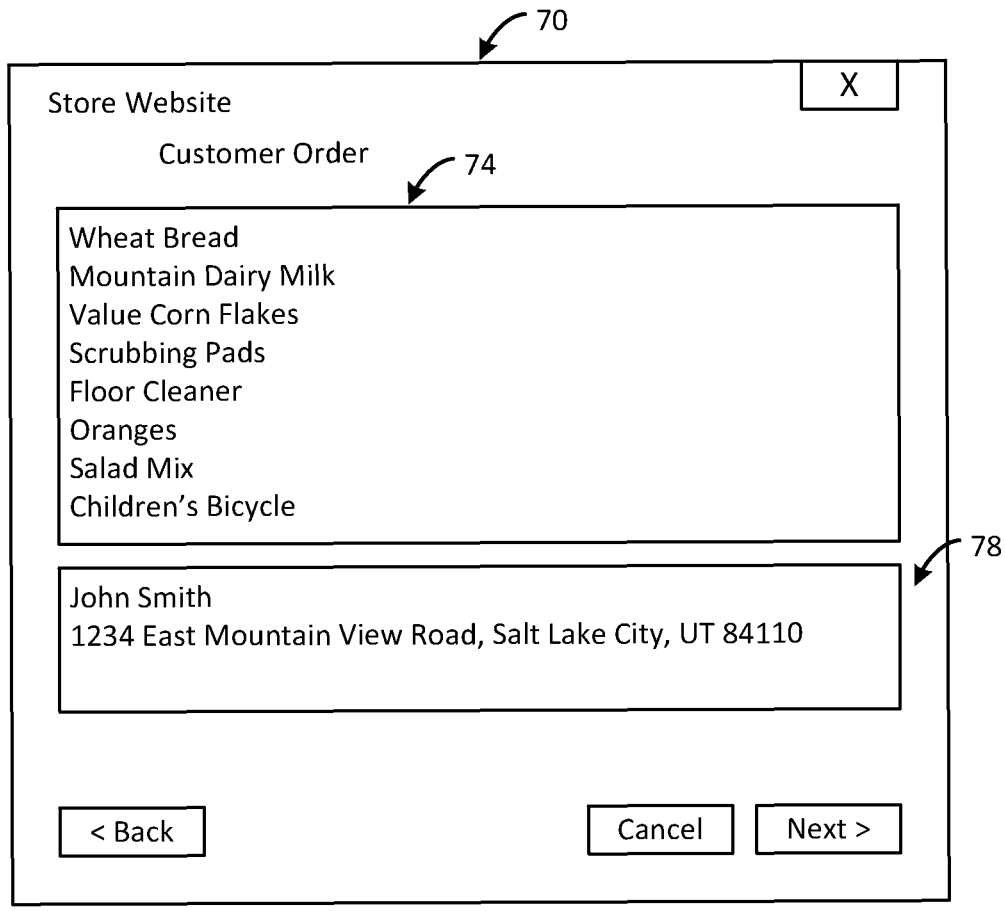
FIG. 5 is a schematic illustrating a store website.
Figure 6:
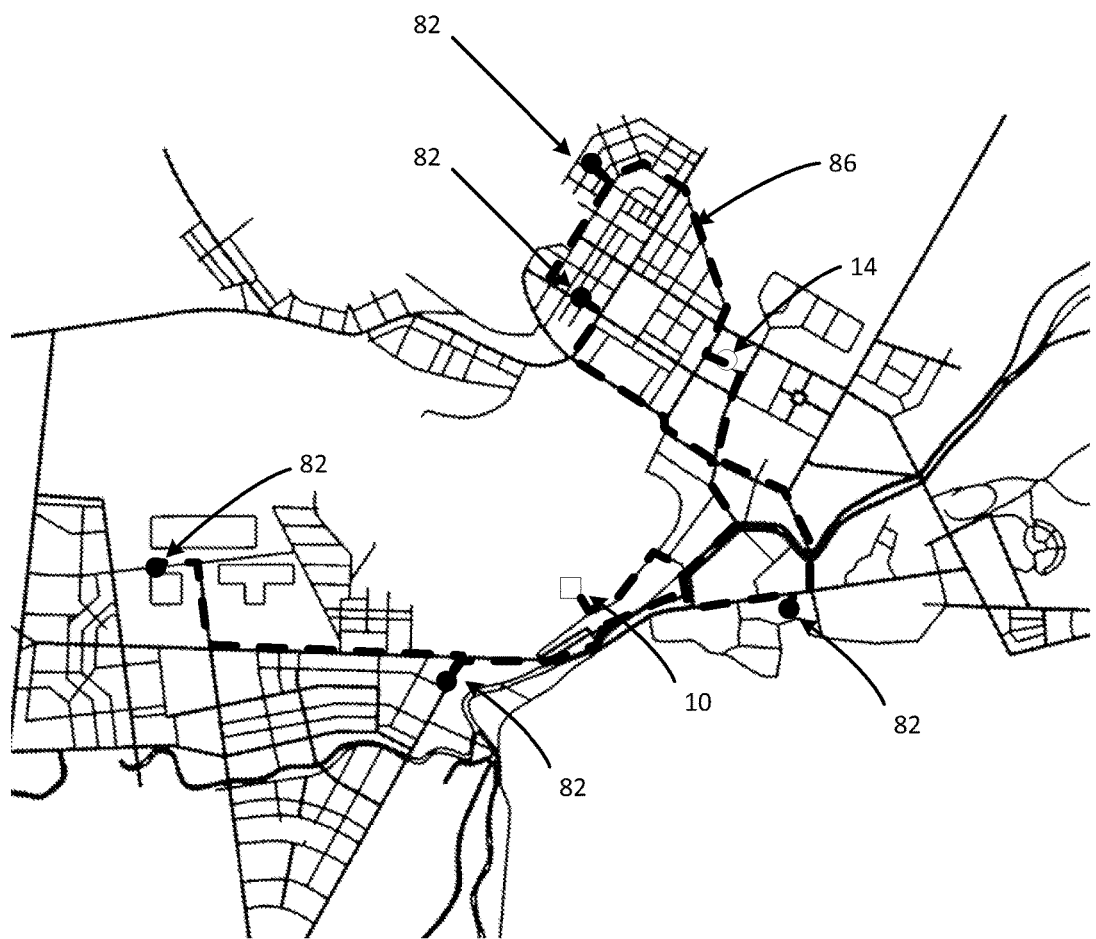
FIG. 6 is a drawing illustrating a map of a delivery area.

Referring to FIG. 5, a customer may use a store website 70 to order various items 74 for delivery to a customer location 14. In an online store environment, the customer may browse through items available for home delivery and may select items 74 which they desire to purchase. The store server 22 may receive customer information 78 including a customer address. A customer may have created an account with the store server 22, or may enter this information while making a purchase. The store server 22 transmits customer information 78 including a customer address to the delivery server Referring to FIG. 6, the delivery server 30 receives the address of the customer from the store server 22 (or latitude and longitude coordinates corresponding to the customer address). The delivery server 30 manages routes 86 of delivery vehicles which deliver customer orders to different customer locations 14, 82. Typically, other customer orders will have been previously placed which correspond to delivery locations 82. The delivery server 30 will create delivery routes 86 from map and traffic data, customer delivery locations 82, etc. The delivery server 30 may create routes 86 based on predetermined efficient routes through a city or area, and may select or modify these as customer delivery locations 82 are added. Although one route 86 and a few delivery locations 82 are shown, it will be appreciated that the system will typically handle multiple delivery routes 86 and may often handle multiple delivery vehicles in a particular area.

The delivery server 30 may determine, from the customer address, latitude and longitude coordinates for the delivery location 14. The delivery server 30 may then determines, for the delivery route 86, when a delivery vehicle may pass by delivery location 14. The delivery server 30 may determine how much transit time is required to go to deliver location 14 as well as how much time is required to deliver a package to delivery location 14. The delivery server 30 may determine which customer deliveries must be delivered before and after delivery location 14 and what time period of delivery these require. The delivery server 30 may use this information to determine if the delivery vehicle has sufficient time to deliver to customer location 14 during a particular segment of the delivery route 86.

As a delivery vehicle may pass reasonably close to customer location 14 during execution of a delivery route 86, multiple possible delivery times may be identified where a delivery vehicle has sufficient time to deliver to customer location 14 during a single delivery route 86. The delivery server 30 may analyze existing delivery appointments for future delivery routes 86 corresponding to multiple delivery vehicles and identify a plurality of potential delivery times for customer location 14. Each of these plurality of delivery times would correspond to a time where a delivery vehicle executing a delivery route 86 currently being assembled from incoming customer orders will have time to deliver to customer location 14.

Figure 7:
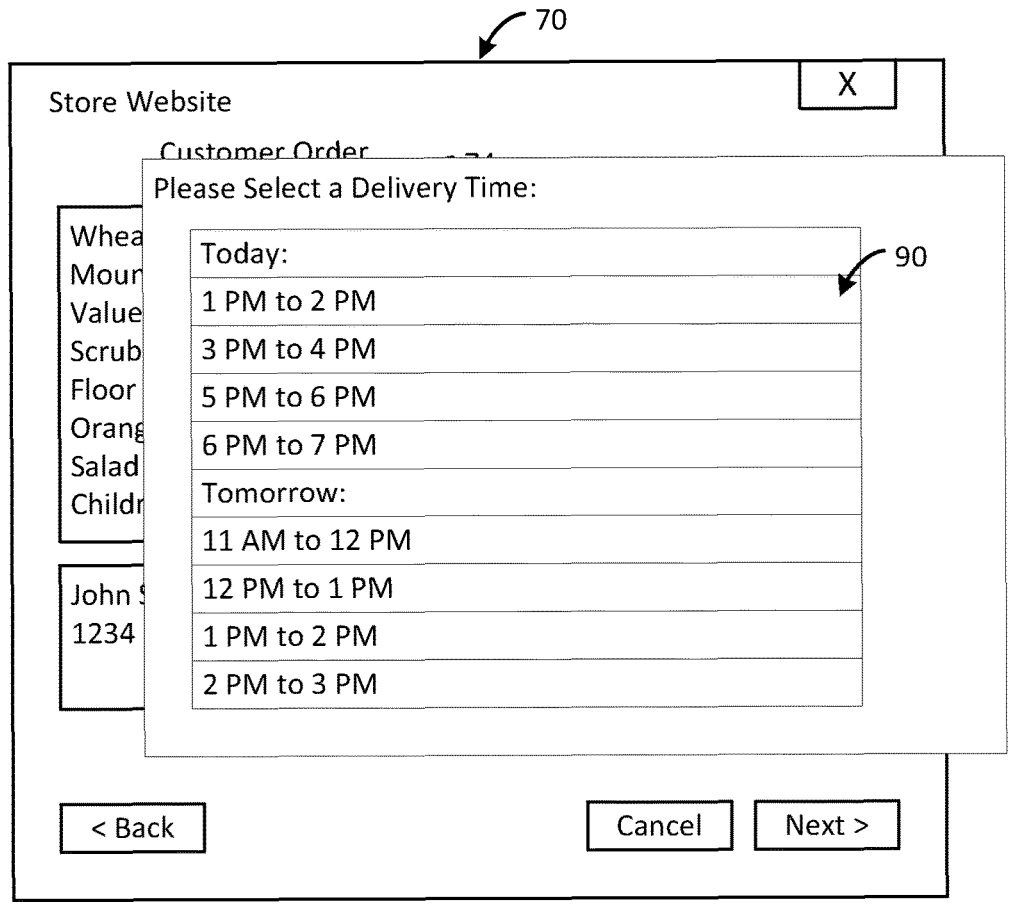
FIG. 7 is a schematic illustrating a store website.
Figure 8:
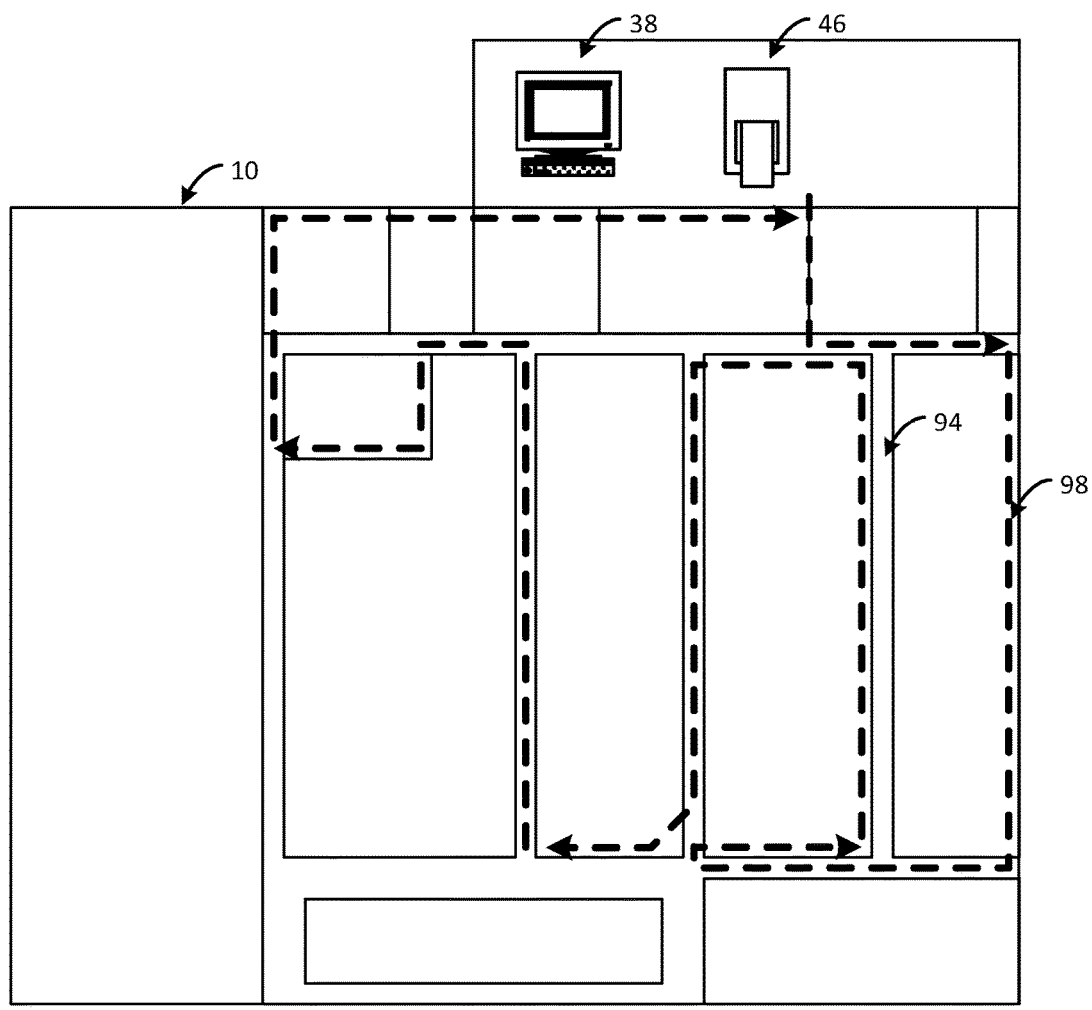
FIG. 8 is a drawing of a store and a picking route.

The delivery server 30 may then transmit to the store server 22 a list of the available delivery times corresponding to customer location 14. As illustrated in FIG. 7, the store server 22 may receive the list of available delivery times, determine corresponding delivery windows, and present a list of available delivery windows 90 to the customer via the website 70. The delivery windows 90 will typically be predetermined windows of time, such as 30 minute or one hour windows. The customer may select a delivery window 90 and then proceed to checkout and finalize their purchase. The customer would typically confirm their order, address, and customer information, enter any special requests, and pay for their order.

The store server 22 and/or delivery server 30 may quickly determine latitude and longitude coordinates from the customer address, analyze future delivery locations 82 and deliver routs 86, determine when a delivery vehicle may deliver to the customer location 14, determine corresponding delivery windows, and present delivery windows 90 to the customer. All this may happen quickly as the customer proceeds to checkout.

Once a customer has selected a delivery time, the delivery server 30 may provisionally hold that delivery time on the delivery route 86. Once the customer has finalized and paid for their order, the delivery server 30 may reserve the delivery time for the customer and integrate the delivery location 14 into a delivery route 86. The store server 22 may send information to the delivery server 30 to allow the delivery server 30 to reserve delivery times as customer orders are placed.

In this manner, the delivery server 30 may build delivery routes 86 corresponding to customer delivery locations 14, 82 based off of traffic patterns and road types and based off of existing and potential customer orders to create efficient delivery routes 86. The delivery server 30 may use actual customer information corresponding to a potential order and actual future delivery routes to determine available times for delivery to that customer. These available delivery times are presented to the customer as possible delivery windows and the customer can select a delivery window.

The store server 22/delivery server 30 may use predetermined time windows for a delivery route 86. For example, a delivery route may typically take 4 hours. As such, the store server 22 may identify particular predetermined start times for deliver routes. The store server 22 may identify that delivery routes start at Noon, 2 PM, and 4 PM. In this example, three delivery vehicles would be possible candidates for delivering to a customer at about 4 PM and two delivery vehicles would be possible candidates for delivering to a customer between 2 PM and 6 PM. In offering delivery windows to customers, the store server 22 and delivery server 30 may store and use a predetermined time duration for a delivery route 86. For example, a delivery route 86 may be scheduled to take 4 hours. The servers 22 may use this predetermined time duration for delivery to calculate how many deliveries the delivery vehicle may deliver during the route.

For each predetermined delivery route start time, the store server 22 may have a predetermined cutoff time when orders may no longer be placed for delivery by that delivery vehicle. A time period such as an hour may be provided between the cutoff time for a delivery route/vehicle and the start of that delivery route. This cutoff time period may provide sufficient time to verify payment of the orders for that delivery route 86, finalize and provide the delivery route to the delivery service 34, pick the items for the order, and begin delivery.

When the cutoff time for a delivery route 86 is reached, the delivery server 30 no longer accepts customer orders for that delivery route and transmits route information to the store server 22. The delivery server 30 may provide customer location and corresponding delivery time data to the store server 22 for the whole delivery route. Additionally, the delivery server 30 may provide a predetermined route 86 including driving directions to allow for efficient delivery.

The store server 22 may identify the cutoff time for a delivery route 86 and request the delivery locations and route information from the delivery server 30. The store server 22 may verify payment for each of the customer orders associated with the delivery route 86. If payment has not been received for a customer order, that order may be removed from the delivery route. For each order on the delivery route, the store server 22 may then append additional customer information to the delivery location. This customer information may include specifics regarding the delivery, etc. The store server 22 may then transmit the delivery route information with appended customer information to the delivery service 34.

The store server 22 receives the delivery route information from the delivery server 30 and adds additional information for each delivery location. The store server may add a delivery time window, an order identification number, customer information, customer address, customer specific instructions, past customer complaints, etc. to the delivery location information. The store server may thus create an information rich delivery route which may then be provided to the delivery service 34. The delivery service 34 may provide a delivery vehicle which picks up orders from the store 10 and follows the delivery route 86 created by the delivery server 30 and uses the customer information provided by the store server 22 to deliver to the customers in the time window and in the manner desired by the customers.

The store server 22 may transmit order information for the delivery route 86 to an order fulfillment system 38. The order fulfillment system 38 may include an order fulfillment computer 38 and other devices such as a handheld device 46. For each order, the store server 22 may transmit an order identification such as a customer name, order number, etc. along with a list of items from the store 10 which pertain to that order. The order fulfillment system 38 may assist store employees in collecting items for each order on a delivery route 86.

In one example, the order fulfillment system 38 may be associated with a particular store 10. A store 10 may include an order fulfillment computer 38 and one or more mobile devices 46. The order fulfillment computer 38 may receive order information corresponding to a delivery route 86 from the store server 22. The order fulfillment computer 38 may streamline the collection of items from the store 10. The order fulfillment computer 38 may include a layout of the store 10 which indicates which types of items are found on the various isles 94 in the store. The order fulfillment computer 38 may store information regarding where different commodity groups or product types are located throughout the store 10. The order fulfillment computer 38 may store a product picking route (indicated by arrows 98) which directs a store employee through the store 10 in a predetermined manner.

The order fulfillment computer 38 may receive a customer order and arrange the items on the customer order so that the items are encountered sequentially in the store as a store employee follows a predetermined picking route 98 through the store 10. The order fulfillment computer 38 may receive a number of customer orders associated with a delivery route 86 and may combine items from all of the orders into a single pick list, allowing a store employee to follow a pick route 98 a single time through the store 10 to collect all items for all of the orders. The order fulfillment computer 38 may divide the items into a few different groups. For example, the order fulfillment computer may divide the order items into a group of frozen items, a group of refrigerated items, and a group of non-cooled items. The order fulfillment computer 38 may allow multiple store employees to work separately to pick items for the orders while still working in a coordinated manner and moving throughout the store 10 efficiently.

Figure 9:
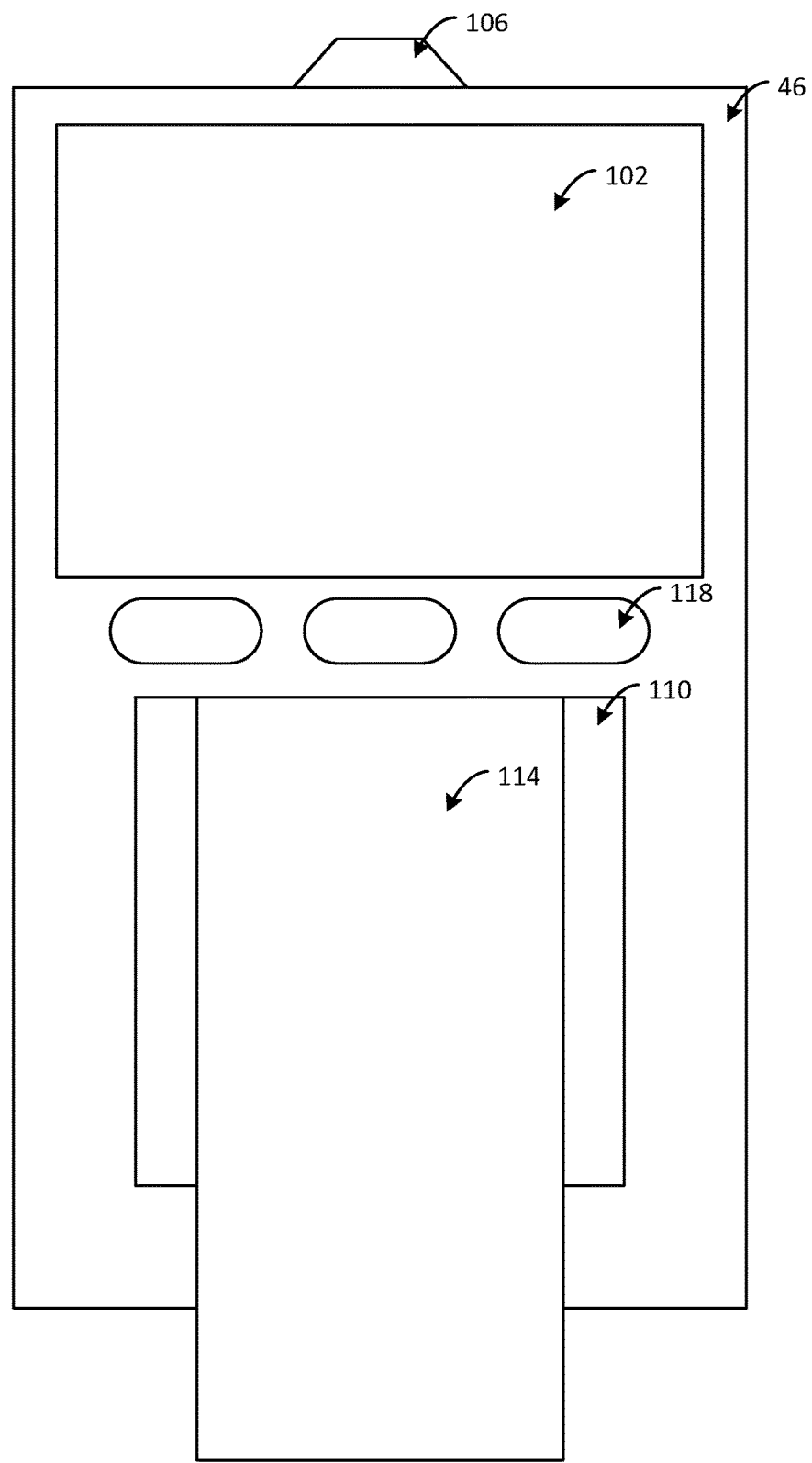
FIG. 9 is a schematic of a handheld device.

Referring to FIG. 9, a store employee may use a handheld computer device 46 while collecting items for the customer orders. The handheld device 46 may perform several functions. The handheld device 46 may communicate with the order fulfillment computer 38 to receive a list of items which need to be collected from the store 10 to fulfill the orders. The handheld device 46 may include a display 102. The display 102 may present a list of items to the store employee in the order that the employee will encounter the items while following a picking route 98 through the store 10. The display 102 may also present the picking route 98 to the employee; indicating how the employee should progress through the store 10 while collecting items for the customer orders.

The order fulfillment computer 38 may store item information for all store items which are available for purchase and delivery to a customer location 14. For example, the order fulfillment computer 38 may store a product identification code for each available store item, the UPC code for each item, item location on the store shelves, and other information necessary. When a store employee collects an item for the customer orders, the employee may use a scanner 106 on the handheld device 46 to scan the item UPC code. The handheld device may determine if the item is necessary for the customer orders and may indicate whether or not the item is correct to the employee. If correct, the employee may be directed to place the item in a collection receptacle for the customer orders. The handheld device 465 may use a printer 110 to print a sticker label 114 for the item.

The sticker label 114 may include a code, barcode, or other machine readable code to identify a particular customer order to which the item pertains. The label 114 may be affixed to the item as the employee collects the item. If desired, the employee may carry multiple boxes or containers corresponding to the various customer orders and may sort items into the appropriate order receptacle as the items are collected throughout the store 10. It is, however, appreciated that there may often be a sufficient number of customer orders to make it impractical to carry sufficient order receptacles through the store 10. The employee may place items into a single receptacle and bring items to a back area of the store for sorting into different customer orders.

The handheld device 46 may include buttons 118 and other input/output or customer interface devices as permit the store employee to perform the designated functions. The handheld device 46 may also include a communications device to permit the handheld device 46 to communicate with the order fulfillment computer 38, such as by communicating over a store wireless network.

Typically, customer orders for a delivery route 86 are finalized and presented via the order fulfillment computer 38 after the delivery route is finalized. The order fulfillment computer 38 may allow store employees to see customer orders which have not been verified. This may allow store employees to monitor large orders or orders in a period of high demand and, if desired, start to collect items for these orders before the delivery route 86 is finalized to be able to meet the demand.

After all orders are collected and made ready for delivery at the store 10, the customer orders are given to the delivery service 34 and a delivery vehicle will take the orders to the customer locations 14, 82 for delivery. The delivery vehicle may follow a delivery route 86 provided by the delivery server 30 and may follow delivery instructions and additional information provided by the store server 22.

Figure 10:
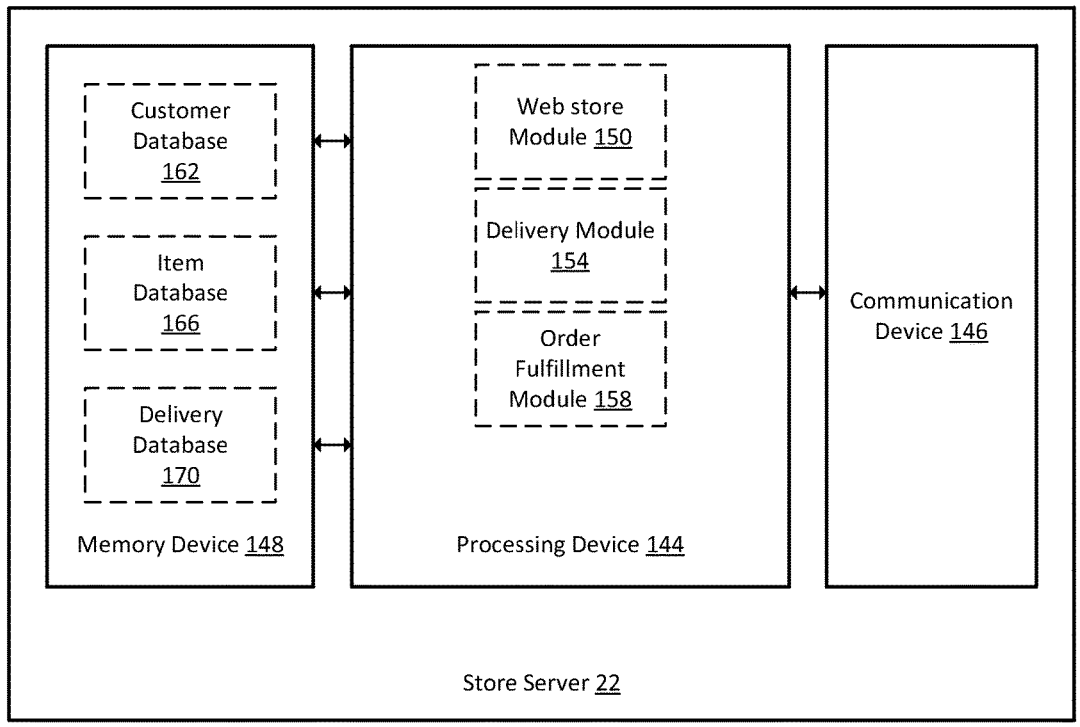
FIG. 10 is a schematic illustrating example components of a server.

As referenced above, the store server 22 may be configured to perform one or more functions associated with receiving an order from a customer, managing delivery routes and delivery vehicles, and streamlining the collection of items for customer orders. FIG. 10 illustrates an example of the store server 22 configured to perform one or more of the requested functions. In the illustrated embodiment, the server 22 may include a processing device 144, a communication device 146, and a memory device 148.

The processing device 144 can include memory, e.g., read only memory (ROM) and random access memory (RAM), storing processor-executable instructions and one or more processors that execute the processor-executable instructions. In embodiments where the processing device 144 includes two or more processors, the processors can operate in a parallel or distributed manner. In an example, the processing device 144 may execute a web store module 150, a delivery module 154, and an order fulfillment module 158.

The communication device 146 is a device that allows the server 22 to communicate with another device, e.g., the customer computer 26, delivery service computer 34, mobile device 46, etc. The communication device 146 can include one or more wireless transceivers for performing wireless communication and/or one or more communication ports for performing wired communication.

The memory device 148 is a device that stores data generated or received by the server 34. The memory device 148 can include, but is not limited to a hard disc drive, an optical disc drive, and/or a flash memory drive. Further, the memory device 148 may be distributed and located at multiple locations. The memory device 148 is accessible to the processing device 144. In some embodiments, the memory device 148 stores a customer database 162, an item database 166, and a delivery database 170.

In some examples, the customer database 162 can store information associated with a customer. The customer database 162 may, for example, store information associated with a customer account and may include account preferences and customer contact information. The customer database 162 may also store information regarding a customer delivery address as well as specific details regarding delivery of items to the delivery address. The customer database 162 may be queried by the processing device 144 and may provide information to the processing device to facilitate receiving an order from a customer and delivering an order to the customer.

In some examples, the item database 166 stores item information associated with items or types of items in the store 10. For example, the item database 166 may store identification codes, UPC codes, item location in the store 10, as well as other information associated with the items. By way of example, the item database 166 may be queried by the processing device 144 and may transmit information to the processing device to facilitate the use of item data.

In some examples, the delivery database 170 stores information to facilitate delivery of customer orders to a customer location 14. The delivery database 170 may store information regarding a map of a delivery area or an area around a store 10, street and traffic information for a delivery area, delivery routes, transit times associated with a delivery area, etc.

The processing device 144 may execute the web store module 150. The web store module 150 may present a store interface and item information to a customer, receive customer information and order information, and otherwise handle the purchase transaction with a customer as described herein. The processing device may also execute a delivery module 154. The delivery module may receive customer delivery address information from the web store module 150 and may determine customer location, compare location with existing delivery routes, determine available delivery times, schedule deliveries, create delivery routes, and otherwise manage delivery of customer orders. The web store module 150 may receive potential delivery times from the delivery module 154 and present these potential delivery times to a customer to allow the customer to select a delivery window for their order. The processing device 144 may further close orders for a delivery route, finalize the delivery route, and interface with a shipping service 34 to deliver orders to customers.

The processing device 144 may execute an order fulfillment module 158. The order fulfillment module may receive customer order information for a delivery route and may facilitate the collection of items from a store to fulfill the customer orders. The order fulfillment module 158 may combine orders together, arrange items according to a predetermined pricking outré through a store, and direct a store employee through the store to collect items for the customer orders.

Figure 11:
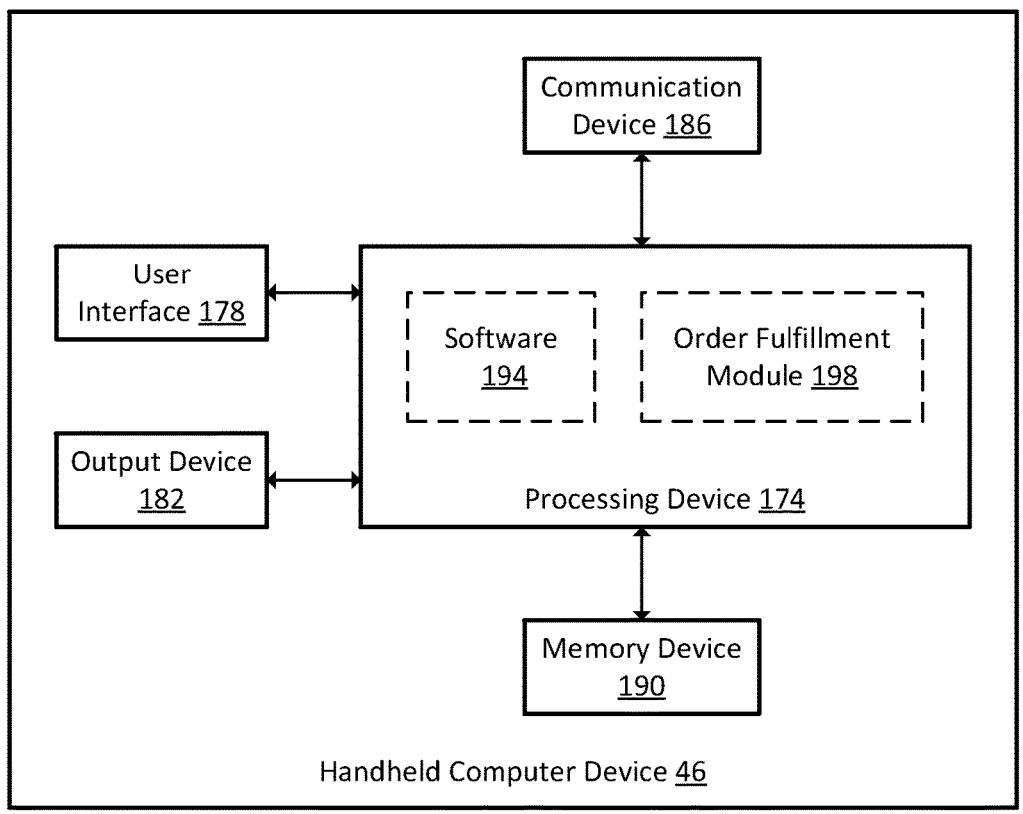
FIG. 11 is a schematic illustrating example components of a handheld device.

Referring now to FIG. 11, a schematic showing example components of the handheld computer device 46 is illustrated. The handheld device 46 may include a processing device 174, a user interface 178, an output device 182, a communication device 186, and a memory device 190. It is noted that the handheld computer device 46 can include other components and some of the components may not be required in every example.

The processing device 174 can include memory, e.g., read only memory (ROM) and random access memory (RAM), storing processor-executable instructions and one or more processors that execute the processor-executable instructions. In embodiments where the processing device 174 includes two or more processors, the processors can operate in a parallel or distributed manner. The processing device 174 can execute an operating system of the handheld computer device 46. In the illustrative example, the processing device 174 also executes a software module 194 such as scanning and printing software and an order fulfillment module 198.

The user interface 178 is a device that allows a user, a store employee in particular, to interact with the handheld device 46. While one user interface 178 is shown, the term "user interface" can include, but is not limited to, a touch screen, a physical keyboard, a mouse, a microphone, and/or a speaker. The output device 182 is a device which allows a store employee to output information from the handheld device 46. In particular, the output device 182 may allow a store employee to print labels for store items and associate collected store items with a particular customer order. The communication device 186 is a device that allows the handheld computer device 46 to communicate with another device, e.g., the server 22. The communication device 186 can include one or more wireless transceivers for performing wireless communication and/or one or more communication ports for performing wired communication. The memory device 190 is a device that stores data generated or received by the device 46. The memory device 190 can include, but is not limited to, a hard disc drive, an optical disc drive, and/or a flash memory drive. The software 194 may be stored on the memory device 190 and the order fulfillment module 198 may be created from the software 194.

The order fulfillment module 198 allows a user, a store employee in particular, to efficiently collect items from a store 10 to fulfill customer orders. The order fulfillment module 198 may execute some or all of the functions described herein to receive one or more customer orders, combine those customer orders, order items in the customer orders sequentially according to a predetermined picking route through the store, and guide an employee through the store to collect the items necessary to fulfill the customer orders.

The examples discussed provide significant advantages. As a customer places an order, actual customer information may be used to determine accurate delivery times for the order. These delivery times allow the store 10 to offer the customer delivery windows according to actual availability on a delivery route. The determination of delivery availability may be performed in real time and customers may be offered verified delivery windows for delivery on the same day that the order is placed. The delivery route may be managed in a way that allows for same day delivery while still creating a delivery route which is efficient. A delivery route may be appended with actual customer information including specific information about the delivery location, customer deliver requests, etc.

Items for one or multiple customer orders may be collected quickly and efficiently. Items for multiple customer orders may be collected in an hour or less after a delivery route is closed to future orders. Store employees may be directed through a store in a predetermined picking route and items may be presented to the employees on a handheld computer in the order that the employee will encounter the items. The handheld computer can scan and track items to verify that the orders are fulfilled, and can also label items to facilitate the sorting of the items into multiple packages for delivery to multiple customers. A store is able to deliver orders to many customers on the same day that the order is placed while maintaining cost effective and efficient order picking and delivery.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer implemented method comprising:
    a computer system with one or more processors comprising a store server presenting items for purchase to a customer via a website, wherein a store comprises a brick and mortar store;
    the store server receiving an order of an item from the customer;
    the store server receiving customer information from the customer including a delivery location for delivery of the item;
    the store server providing the delivery location to a delivery server;
    the delivery server comparing the delivery location to existing delivery locations for a delivery route to the delivery location;
    the delivery server analyzing at least one of one or more traffic patterns or one or more road types on the delivery route to the delivery location;
    the delivery server determining whether a history of at least one of one or more specific instructions from the customer or one or more past complaints from the customer exists;
    in response to determining that the history of the at least one of the one or more specific instructions from the customer or the one or more past complaints from the customer exists, the delivery server analyzing the at least one of the one or more specific instructions from the customer or the one or more past complaints from the customer;
    the delivery server creating one or more optimized delivery routes based on an analysis of the at least one of the one or more traffic patterns or the one or more road types on the delivery route to the delivery location and an analysis of the history of the at least one of the one or more specific instructions from the customer or the one or more past complaints from the customer;
    the delivery server providing one or more delivery times to the store server;
    the store server correlating the one or more delivery times with one or more predetermined delivery windows;
    the store server presenting to the customer one or more delivery windows for the order, as correlated, the one or more predetermined delivery windows comprising the one or more delivery windows;
    the store server receiving from the customer a selection of a delivery window from the one or more delivery windows before the customer initiates a check out process for the order;

after the delivery route to the delivery location is finalized, the store server transmits the order to an order fulfillment computer coupled to a mobile electronic device comprising a user interface configured to display the order, as finalized, while one or more applications are in an un-launched state on the mobile electronic device, the one or more applications comprising an item database and a layout interface of the store;

upon receipt of the order by the order fulfillment computer, the order fulfillment computer configures a particular route mapping the items of the order in the store by retrieving information from the layout interface of the store, wherein the information comprises indications of a location of each of the items of the order in the store;

transmitting, by the order fulfillment computer to the mobile electronic device, the particular route mapping the items of the order in the store to change the user interface of the mobile electronic device to overlay the particular route on the user interface of the mobile electronic device, so that the items of the order can be collected following the particular route;

upon completion of the check out process for the order by the customer, the store server transmits the delivery window to the delivery server;

the delivery server placing a provisional hold for an order delivery time corresponding to the delivery window before the check out process is initiated until the customer completes the order;

upon completion of the check out process for the order by the customer, the store server transmitting a notification to the delivery server that the customer has completed the order; and the delivery server converting the provisional hold of the order delivery time into a reservation of the order delivery time after receiving the notification that the customer has completed the order.

2. The method of claim 1, wherein the method further comprises:
the delivery server comparing the delivery location to the existing delivery locations for a same day delivery route which is scheduled on a same day as the order is placed;
the delivery server providing potential delivery times on the same day delivery route to the store server; and
the store server presenting to the customer one or more same day delivery windows for the order.

3. The method of claim 1, wherein comparing the delivery location to the existing delivery locations for the delivery route comprises:
determining one or more latitude and longitude coordinates for the delivery location; and
comparing the delivery location to the delivery route.

4. The method of claim 1, wherein comparing the delivery location to the existing delivery locations for the delivery route comprises:
determining transit time to the delivery location relative to a first previously scheduled delivery location and a second previously scheduled delivery location; and
determining whether sufficient time exists between the first previously scheduled delivery location and the second previously scheduled delivery location to travel to the delivery location.

5. The method of claim 1, wherein the method further comprises:
the store server receiving the order, as finalized, from the customer; and
the delivery server allocating time on the delivery route to deliver the order, as finalized.

6. The method of claim 1, wherein the method further comprises:
closing the delivery route to additional orders when a cutoff time is reached;
the delivery server providing the delivery route and the one or more delivery times to the store server;
the store server appending additional customer information to the one or more delivery times; and
the store server providing the delivery route, a delivery schedule, and the additional customer information to a delivery service.

7. The method of claim 1, wherein the method further comprises:
the order fulfillment computer storing one or more predetermined picking routes corresponding to the store; and
the order fulfillment computer ordering items for the order sequentially according to the one or more predetermined picking routes.

8. The method of claim 1, wherein the method further comprises:
the store server providing order information for a plurality of customer orders to the order fulfillment computer;
the order fulfillment computer storing a predetermined picking route of one or more predetermined picking routes corresponding to the store;
the order fulfillment computer grouping one or more items from the plurality of customer orders together; and
the order fulfillment computer ordering the one or more items from the plurality of customer orders sequentially according to the predetermined picking route.

9. The method of claim 1, wherein the method further comprises:
scanning an item UPC code via a handheld device;
the mobile electronic device comprising the handheld device; and
the handheld device printing a label for the item to indicate the order to which the item pertains.

10. The method of claim 1, further comprising:
the customer using the user interface of the mobile electronic device to confirm the items of the order, as collected, correctly match the items of the order.

11. A computer system comprising:
at least one computer-readable medium comprising processor-executable instructions, wherein the processor-executable instructions comprise a web store module and a delivery module; and
at least one processor coupled to the computer-readable medium, the at least one processor executing the web store module and the delivery module to:
present, by the web store module, items for purchase to a customer via a website;
receive, by the web store module, an order of an item from the customer;
receive, by the web store module, customer information from the customer including a delivery location for delivery of the item;
provide, by the web store module, the delivery location to the delivery module;
compare, by the delivery module, the delivery location to existing delivery locations for a delivery route to the delivery location;

analyze, by the delivery module, at least one of one or more traffic patterns or one or more road types on the delivery route to the delivery location;

determining, by the delivery module, whether a history of at least one of one or more specific instructions from the customer or one or more past complaints from the customer exists;

in response to determining that the history of the at least one of the one or more specific instructions from the customer or the one or more past complaints from the customer exists, analyze, by the delivery module, the at least one of the one or more specific instructions from the customer or the one or more past complaints from the customer;

create, by the delivery module, one or more optimized delivery routes based on an analysis of the at least one of the one or more traffic patterns or the one or more road types on the delivery route to the delivery location and an analysis of the history of the at least one of the one or more specific instructions from the customer or the one or more past complaints from the customer;

provide, by the delivery module, one or more delivery times to the web store module;

correlate, by the web store module, the one or more delivery times with one or more predetermined delivery windows;

present to the customer, by the web store module, one or more delivery windows for the order, as correlated, the one or more predetermined delivery windows comprising the one or more delivery windows;

receive, by the web store module, from the customer a selection of a delivery window from the one or more delivery windows before the customer initiates a check out process for the order;

after the delivery route to the delivery location is finalized, the web store module transmits the order to an order fulfillment computer coupled to a mobile electronic device comprising a user interface configured to display the order, as finalized, while one or more applications are in an un-launched state on the mobile electronic device, the one or more applications comprising an item database and a layout interface of a store;

upon receipt of the order by the order fulfillment computer, the order fulfillment computer configures a particular route mapping the items of the order in the store by retrieving information from the layout interface of the store, wherein the information comprises indications of a location of each of the items of the order in the store;

transmitting, by the order fulfillment computer to the mobile electronic device, the particular route mapping the items of the order in the store to change the user interface of the mobile electronic device to overlay the particular route on the user interface of the mobile electronic device, so that the items of the order can be collected following the particular route;

upon completion of the check out process for the order by the customer, transmit, by the web store module, the delivery window to the delivery module;

place, by the delivery module, a provisional hold for an order delivery time corresponding to the delivery window before the check out process is initiated until the customer completes the order;

upon completion of the check out process for the order by the customer, transmit, by the web store module, a notification to the delivery module that the customer has completed the order; and convert, by the delivery module, the provisional hold of the order delivery time into a reservation of the order delivery time after receiving the notification that the customer has completed the order.

12. The system of claim 11, wherein the delivery module is more specifically programmed to:
compare the delivery location to the existing delivery locations for a same day delivery route which is scheduled on a same day as the order is placed;
provide potential delivery times on the delivery route to the web store module; and
wherein the web store module is more specifically programmed to:
present to the customer one or more same day delivery windows for the order.

13. The system of claim 11, wherein the delivery module is more specifically programmed to:
compare the delivery location to the existing delivery locations for the delivery route by determining one or more latitude and longitude coordinates for the delivery location and comparing the delivery location to the delivery route.

14. The system of claim 11, wherein the delivery module is more specifically programmed to:
compare the delivery location to the existing delivery locations for the delivery route by determining transit time to the delivery location relative to a first previously scheduled delivery location and a second previously scheduled delivery location; and determining whether sufficient time exists between the first previously scheduled delivery location and the second previously scheduled delivery location to travel to the delivery location.

15. The system of claim 11, wherein the web store module is programmed to:
receive the order, as finalized, from the customer; and
wherein the delivery module is programmed to:
allocate time on the delivery route to deliver the order as finalized.

16. The system of claim 11, wherein the system is further programmed to:
close the delivery route to additional orders when a cutoff time is reached;
wherein the delivery module is programmed to:
provide the delivery route and the one or more delivery times to the web store module; and
wherein the web store module is programmed to:
append additional customer information to the one or more delivery times; and
provide the delivery route, a delivery schedule, and the additional customer information to a delivery service.

17. The system of claim 11, wherein the order fulfillment module is programmed to:
store one or more predetermined picking routes corresponding to the store; and
order items for the order sequentially according to the one or more predetermined picking routes.

18. The system of claim 11, wherein:
the web store module is programmed to:
provide order information for a plurality of customer orders to the order fulfillment module; and
the order fulfillment module is programmed to:
store one or more predetermined picking routes corresponding to the store;

group one or more items from the plurality of customer orders together; and order the one or more items for the plurality of customer orders sequentially according to the one or more predetermined picking routes.

19. The system of claim 11, wherein the system further comprises:

a handheld device programmed to:

scan an item UPC code;

the mobile electronic device comprising the handheld device; and print a label for the item to indicate the order to which the item pertains.

20. The system of claim 11, further comprises:

the customer using the user interface of the mobile electronic device to confirm the items of the order, as collected, correctly match the items of the order.

* * * * *